(12) United States Patent
Liu et al.

(10) Patent No.: US 9,868,123 B2
(45) Date of Patent: Jan. 16, 2018

(54) PURIFICATION AND VARIABLE FREQUENCY SYSTEM AND METHOD

(71) Applicant: SUZHOU BEIANG TECHNOLOGY LTD., Suzhou (CN)

(72) Inventors: Yigang Liu, Suzhou (CN); Hongyu Ran, Suzhou (CN); Xianghui Gao, Suzhou (CN)

(73) Assignee: SUZHOU BEIANG TECHNOLOGY LTD., Suzhou (CN)

( * ) Notice: Subject to any disclaimer, the term of this patent is extended or adjusted under 35 U.S.C. 154(b) by 107 days.

(21) Appl. No.: 14/555,665

(22) Filed: Nov. 27, 2014

(65) Prior Publication Data

US 2015/0082980 A1 Mar. 26, 2015

Related U.S. Application Data

(63) Continuation of application No. PCT/CN2013/076947, filed on Jun. 7, 2013.

(30) Foreign Application Priority Data

Jun. 11, 2012 (CN) .......................... 2012 1 0190304
Jun. 11, 2012 (CN) .......................... 2012 1 0190542

(51) Int. Cl.
*B03C 3/12* (2006.01)
*B03C 3/86* (2006.01)
(Continued)

(52) U.S. Cl.
CPC ............... *B03C 3/12* (2013.01); *B01D 53/32* (2013.01); *B03C 3/09* (2013.01); *B03C 3/41* (2013.01);
(Continued)

(58) Field of Classification Search
USPC ................................ 204/165, 177, 178, 179
See application file for complete search history.

(56) References Cited

U.S. PATENT DOCUMENTS 1,959,374 A * 5/1934 Lissman ................... B03C 3/66
307/107
2,000,020 A * 5/1935 Heinrich ................... B03C 3/66
315/180

(Continued)

FOREIGN PATENT DOCUMENTS

EP 1249265 * 10/2002
WO WO 9913973 * 3/1999

*Primary Examiner* — Duane Smith
*Assistant Examiner* — Sonji Turner
(74) *Attorney, Agent, or Firm* — Syncoda LLC; Feng Ma; Junjie Feng

(57) ABSTRACT

An air cleaning apparatus includes ion generation electrode, a collecting electrode, and a support portion. The ion generation electrode is configured to apply a high-voltage to thereby form a high-voltage electric field between the collecting electrode and the ion generation electrode. A passage is formed between the ion generation electrode and the collecting electrode along the high-voltage electric field direction. The support portion is configured to provide electrical isolation and mechanical support for the ion generation electrode and the collecting electrode. A surface of the support portion between the ion generation electrode and the collecting electrode comprises a surface coating layer configured to resist ion bombardment and the accidental arcing. A transformer frequency adjusting system includes a frequency storage cell, a control module, and a drive module, and can work with the air cleaning apparatus, alone, or with other apparatuses.

19 Claims, 14 Drawing Sheets

(51) Int. Cl.
  B01D 53/32 (2006.01)
  B03C 3/41 (2006.01)
  B03C 3/47 (2006.01)
  B03C 3/09 (2006.01)
  B03C 3/68 (2006.01)

(52) U.S. Cl.
  CPC ............... B03C 3/47 (2013.01); B03C 3/68 (2013.01); B03C 3/86 (2013.01); B03C 2201/04 (2013.01); B03C 2201/24 (2013.01)

(56) References Cited

U.S. PATENT DOCUMENTS

| | | | | |
|---|---|---|---|---|
| 3,729,575 A * | 4/1973 | Harding | ............... | H01B 1/00 174/138 R |
| 4,216,000 A * | 8/1980 | Kofoid | ............... | B03C 3/38 361/230 |
| 5,903,450 A * | 5/1999 | Johnson | ............... | B03C 3/66 323/903 |
| 5,914,015 A * | 6/1999 | Barlow | ............... | B01D 53/32 204/164 |
| 5,993,521 A * | 11/1999 | Loreth | ............... | B03C 3/12 96/69 |
| 6,334,986 B2 * | 1/2002 | Gieshoff | ............... | B01D 53/32 423/213.2 |
| 6,727,657 B2 * | 4/2004 | Krichtafovitch | ............... | B03C 3/68 310/308 |
| 6,937,455 B2 * | 8/2005 | Krichtafovitch | ............... | B03C 3/68 361/230 |
| 7,081,152 B2 * | 7/2006 | Altman | ............... | B03C 3/68 323/903 |
| 7,258,729 B1 * | 8/2007 | Barsimanto | ............... | B03C 3/09 96/226 |
| 7,547,353 B2 * | 6/2009 | Reyes | ............... | B03C 3/68 323/247 |
| 7,594,958 B2 * | 9/2009 | Krichtafovitch | ............... | B03C 3/68 315/506 |
| 2007/0148061 A1 * | 6/2007 | Lau | ............... | F24F 3/166 422/186.04 |
| 2008/0264249 A1 * | 10/2008 | Truce | ............... | B03C 3/68 95/6 |
| 2010/0155025 A1 * | 6/2010 | Jewell-Larsen | ............... | F04B 19/006 165/96 |

* cited by examiner

PURIFICATION AND VARIABLE FREQUENCY SYSTEM AND METHOD

CROSS-REFERENCE TO RELATED APPLICATIONS

The present application is a continuation of, and claims priority to, PCT/CN2013/076947 filed on Jun. 7, 2013, which claims priority to Chinese Patent Application Nos. CN201210190304.X, and CN201210190542.0 filed on Jun. 11, 2012. The disclosures of these applications are hereby incorporated by reference in their entirety.

BACKGROUND

An air cleaner or purifier can employ a high-voltage electric field generated by a high-voltage source, thereby attracting dust in the air to achieve cleaning. A high-voltage source, shown in FIG. 1, generally includes of two opposing metal components a and b. The two metal components with a gas passage can be assembled together with an insulating frame. When a high voltage is applied on the two metal components, a high-voltage electric field is formed between the two metal components. When the air flow passes through the metal components a and b, the dust in the air can be attracted to the metal component b as a result of the high-voltage electric field.

The air cleaner can have different voltages from a transformer using electromagnetic induction principle. A transformer can include: first winding, second winding, and the core. A high-frequency transformer with an operating frequency of more than 10 kHz, high conversion efficiency, small size and other characteristics can be used in switching power supply systems and high-power, high-voltage-frequency inverter transformer systems.

SUMMARY

The present disclosure provides a novel air cleaning device using high-voltage ionic purification to extend the life of the air cleaning device.

The present disclosure relates to the fields of high-voltage electrostatic dusting and transformer controlling, especially, to high-voltage ionic purification device for air cleaning and correlative method and system for adjusting the voltage frequency of the transformer.

The present disclosure provides a high-voltage ionic purification device, including the ion generation electrode, and the collecting electrode and the support portion, wherein the ion generation electrode is configured to apply a high-voltage; the collecting electrode is disposed opposite to the ion generation electrode and configured to form high electric field between the ion generation electrode and the collecting electrode; a gas passage is formed between the ion generation electrode and the collecting electrode along the high-voltage electric field direction; the support portion supports on the edge of the ion generation electrode and the collecting electrode for electrical isolation and mechanical support, a surface of the support portion between the ion generation electrode and the collecting electrode comprises a surface coating layer configured to resist ion bombardment and the accidental arcing.

Since the surface of the support portion comprises the surface coating layer configured to resist ion bombardment and the accidental arcing, and therefore, even in high humidity environments, a discharge channel is not formed along the surface of the supporting portion between the ion generation electrode and the collecting electrode, it is possible to effectively extend the life of the air purification apparatus.

The present disclosure also provides a method and a system for adjusting the operating frequency of the transformer, the method comprises: selecting at least three frequencies selected from a preset range containing a transformer initial frequency, including the initial frequency, a frequency less than the initial frequency and a frequency greater than the initial frequency; inputting the selected frequencies into the transformer and respectively running for the same preset time; recording output voltages of the transformer under the drive voltages at the corresponding frequencies; determining an adjusted transformer drive voltage frequency based on a drive voltage frequency corresponding to a minimum output voltage of the transformer; inputting into the transformer a drive voltage corresponding to the adjusted transformer drive voltage frequency.

By the method, the present disclosure can set the operating frequency of the transformer as close as possible to the optimum operating frequency, avoiding the effective ratio decreasing, temperature too high and other issues causing by intrinsic deviation frequency between the transformer operating frequency and the optimum operating frequency; and if the preset range is selected properly, it is possible to determine the optimum operating frequency of the transformer to ensure maximum performance of the transformer, and to eliminate the influence of the frequency offset.

To achieve the above object, the present disclosure provides an air cleaning apparatus, comprising an ion generation electrode, a collecting electrode, and a support portion. The ion generation electrode is configured to apply a high-voltage to thereby form a high-voltage electric field between the collecting electrode and the ion generation electrode; a passage is formed between the ion generation electrode and the collecting electrode along the high-voltage electric field direction; the support portion is configured to provide electrical isolation and mechanical support for the ion generation electrode and the collecting electrode; a surface of the support portion between the ion generation electrode and the collecting electrode comprises a surface coating layer configured to resist ion bombardment and the accidental arcing.

Preferably, the surface coating layer comprises a hydrophobic migration and electrically insulating material.

Preferably, the surface coating layer comprises one or more of: a room temperature vulcanized (RTV) series material, a rubber-based material, or a ceramic-based material.

Preferably, the surface coating layer is configured to reduce accumulation of carbon layers to thereby reduce conductive channels upon arc burning of the surface coating layer.

Preferably, the surface coating layer is formed by spraying, or applying an adhesive to, the surface of the support portion.

Preferably, the support portion comprises a hydrophobic migration and electrically insulating material.

Preferably, the support portion is formed by injection or extrusion molding.

Preferably, the support portion has an arc-shaped concave portion facing an ion movement trajectory, or the surface of the support portion is disposed away from an ion bombardment region.

Preferably, the support portion and the surface coating layer are composed of a same material.

Compared with the prior art, the air cleaning apparatus in the present disclosure may have advantages including:

The air cleaning apparatus comprises: an ion generation electrode, a collecting electrode, and a support portion. The ion generation electrode is configured to apply a high-voltage to thereby form a high-voltage electric field between the collecting electrode and the ion generation electrode; a passage is formed between the ion generation electrode and the collecting electrode along the high-voltage electric field direction; the support portion is configured to provide electrical isolation and mechanical support for the ion generation electrode and the collecting electrode; a surface of the support portion between the ion generation electrode and the collecting electrode comprises a surface coating layer configured to resist ion bombardment and the accidental arcing. Since the surface of the support portion comprises the surface coating layer configured to resist ion bombardment and the accidental arcing, therefore, even in a high humidity environment, a discharge channel is not formed along the surface of the supporting portion between the ion generation electrode and the collecting electrode, and it overcomes the insulating instability of the plastic or ceramic support portion in the high-voltage electric field, avoids damage to the support portion by the high-voltage, and effectively extends the life of the air cleaning apparatus.

In addition, since the surface of the support portion between the ion generation electrode and the collecting electrode comprises a surface coating layer configured to resist ion bombardment and the accidental arcing, when a high-voltage is applied between the ion generation electrode and the collecting electrode, the strong arcing noise like "bang, bang" will not occur, thus ensuring the regular service of the air cleaning apparatus.

The present disclosure also provides a method for adjusting an operating frequency of a transformer of a high-voltage ionic purification system, which can set the operating frequency of the transformer as close as possible to the optimum operating frequency, avoiding the effective ratio decreasing, temperature too high and other issues causing by intrinsic deviation frequency between the transformer operating frequency and the optimum operating frequency.

Therefore, the method for adjusting an operating frequency of a transformer of a high-voltage ionic purification system comprises: (A) selecting the at least three frequencies; (B) inputting the selected frequencies into the input terminal of the transformer and respectively running for the same preset time, receiving output voltages of the transformer under the drive voltages at the corresponding frequencies; (C) determining an adjusted transformer drive voltage frequency based on a drive voltage frequency corresponding to a minimum output voltage of the transformer according to the received output voltages in step (B); (D) inputting into the transformer a drive voltage corresponding to the adjusted transformer drive voltage frequency as determined in step (C).

Wherein the system comprises an air cleaning apparatus and a transformer frequency adjusting system. The air cleaning apparatus includes an ion generation electrode, a collecting electrode, and a support portion. The ion generation electrode is configured to apply a high-voltage to thereby form a high-voltage electric field between the collecting electrode and the ion generation electrode. A passage is formed between the ion generation electrode and the collecting electrode along the high-voltage electric field direction. The support portion is configured to provide electrical isolation and mechanical support for the ion generation electrode and the collecting electrode. A surface of the support portion between the ion generation electrode and the collecting electrode comprises a surface coating layer configured to resist ion bombardment and the accidental arcing. The transformer frequency adjusting system including a frequency storage cell, a control module, and a drive module. Wherein the control module is configured to read at least three frequencies selected from a preset range containing a transformer initial frequency from the frequency storage cell, including the initial frequency, a frequency less than the initial frequency, and a frequency greater than the initial frequency, to control the drive module to input drive voltages at the corresponding frequencies into the transformer and control the transformer to respectively run for a same preset time, to receive output voltages of the transformer under the drive voltages at the corresponding frequencies, to determine an adjusted transformer drive voltage frequency based on a drive voltage frequency corresponding to a minimum output voltage of the transformer, and to control the drive module to input into the transformer a drive voltage corresponding to the adjusted transformer drive voltage frequency.

Preferably, the method further comprises: afterwards of the step (D), replacing the initial frequency of the transformer with the adjusted frequency in step (C).

Preferably, the method further comprises: after steps (C) and (D), storing the adjusted frequency in step (C); and prior to step (A), determining whether the adjusted frequency is stored; if not, executing step (A); if yes, inputting the drive voltage of the stored adjusted frequency into the input terminal of the transformer.

Preferably, said selecting in said step (A) comprises uniformly selecting.

Preferably, the drive voltages in steps (B) and (D) are rectangular wave drive voltages.

Preferably, the initial frequency is an intrinsic frequency of the transformer.

Preferably, the transformer is a high-frequency transformer.

The present disclosure also provides a high-voltage ionic purification system. the system comprises an air cleaning apparatus and a transformer frequency adjusting system. The air cleaning apparatus includes an ion generation electrode, a collecting electrode, and a support portion. The ion generation electrode is configured to apply a high-voltage to thereby form a high-voltage electric field between the collecting electrode and the ion generation electrode. A passage is formed between the ion generation electrode and the collecting electrode along the high-voltage electric field direction. The support portion is configured to provide electrical isolation and mechanical support for the ion generation electrode and the collecting electrode. A surface of the support portion between the ion generation electrode and the collecting electrode comprises a surface coating layer configured to resist ion bombardment and the accidental arcing. The transformer frequency adjusting system including a frequency storage cell, a control module, and a drive module. Wherein the control module is configured to read at least three frequencies selected from a preset range containing a transformer initial frequency from the frequency storage cell, including the initial frequency, a frequency less than the initial frequency, and a frequency greater than the initial frequency, to control the drive module to input drive voltages at the corresponding frequencies into the transformer and control the transformer to respectively run for a same preset time, to receive output voltages of the transformer under the drive voltages at the corresponding frequencies, to determine an adjusted transformer drive voltage frequency based on a drive voltage frequency corresponding to a minimum output voltage of the transformer, and to control the drive module to input into the transformer a drive voltage corresponding to the adjusted transformer drive voltage frequency.

Preferably, the system further comprises: a voltage measuring unit coupled to an output terminal of the transformer, and configured to measure the output voltages of the transformer.

Preferably, the control module comprises: a read sub-module and a control sub-module. The read sub-module is configured to read the at least three frequencies and send the read frequencies to the control sub-module; the control sub-module is configured to receive the read frequencies from the read sub-module, control the driver module to input the drive voltages for the frequencies into the transformer and control the transformer to respectively run the same preset time, notify the voltage measuring unit to measure the output voltages of the transformer in a same preset time interval, receive the output voltages measured by the voltage measuring unit, determine an adjusted transformer drive voltage frequency based on a drive voltage frequency corresponding to a minimum output voltage of the transformer, and control the drive module to input into the transformer a drive voltage corresponding to the adjusted transformer drive voltage frequency.

Preferably, the transformer frequency adjusting system further comprises: a MOS transistor, a gate electrode of the MOS transistor is coupled to the driver module, a source electrode of the MOS transistor is grounded, and a drain electrode of the MOS transistor is coupled to an input terminal of the transformer.

Preferably, the transformer is a high-frequency transformer.

In accordance with the present disclosure, the system selects at least three frequencies selected from a preset range containing a transformer initial frequency, including the initial frequency, a frequency less than the initial frequency, and a frequency greater than the initial frequency, controls the transformer to respectively run a same preset time, determines the operating frequency in the preset range which is closest to the optimum operating frequency of the transformer according to the output voltage of the transformer, adjusts the operating frequency of the transformer to the adjusted transformer drive voltage frequency mentioned above. Make the operating frequency of the transformer as close as possible to the optimum operating frequency, if the preset range is selected properly, it is possible to determine the optimum operating frequency of the transformer, and set the optimum operating frequency as the operating frequency of the transformer, so as to ensure maximum performance of the transformer, and to eliminate the influence of the frequency offset.

Shown in the drawings, the above and other objects, features and advantages of the present disclosure will become clearer. In the drawings the same reference numerals indicate the same parts. Not deliberately scaled according to the actual dimensions and the like drawings are, emphasis showing the gist of the invention.

DETAILED DESCRIPTION

Figure 1:
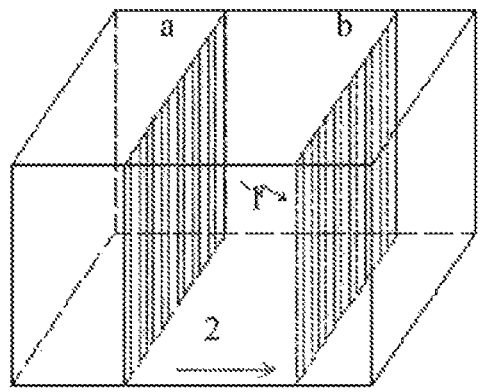
FIG. 1 is a structure schematic view of a conventional air cleaning apparatus.

Referring to the drawings, the following specific embodiments of the present disclosure will be described. The descriptions of the following specific embodiments are merely part of the present disclosure, but not all of the present disclosure. The present disclosure may be practiced in various ways without departing from the principles disclosed and discussed. The present disclosure is to be defined and limited only by the appended claims.

When the air cleaning apparatus is operating, high-voltage exerted on the metal members a, b of the air cleaning apparatus will form two discharge channels, referring to FIG. 1, a discharge channel 1 and a discharge channel 2, wherein the discharge channel 1 is formed between the two metal members a, b with air as dielectric, which is the necessary carrier of the air cleaning apparatus for adsorbing dust particles; the discharge channel 2 with a high-voltage discharge current starts from metal member a, crawls along the surface of the support portion, conducts to the metal member b, the high-voltage current may cause the surface of the support portion carbonized quickly; with the carbonization of the surface, the resistivity of the surface closes to the conductive state, then causes the high-voltage electric field short-circuit or weaken, and thus makes the function for adsorbing dust particles weaken or lost, and also makes a strong arcing noise like "bang bang", affects the regular service of the air cleaning apparatus.

In order to extend the life of the air cleaning apparatus, the support portion is usually made of insulating material, such as plastic or ceramic, to reduce the voltage difference between the two metal members so as to reduce the high-voltage discharge current along the surface of the support portion through the channel 2. However, since the voltage difference between the two metal members is reduced by using this method, the strength of electric field decreases and the function for adsorbing dust particles becomes weak. It can also reduce the voltage difference between the two metal members while reducing the distance between two metal members to ensure the strength of the electric field between the two metal members, which can guarantee purifying effect. However, when the air cleaning apparatus with the above plastic or ceramic support portions is used in high temperature and humid environment, moisture in the air still covers on the surface of the support portion, and the conductive channel is formed along the moisture covered on the surface by the high-voltage electric field, thereby damaging the support portion and reducing the life of the air cleaning apparatus.

The present disclosure provides a air cleaning apparatus, including the ion generation electrode, the collecting electrode and the support portion, wherein the ion generation electrode is configured to apply a high-voltage to thereby form a high-voltage electric field between the collecting electrode and the ion generation electrode; a passage is formed between the ion generation electrode and the collecting electrode along the high-voltage electric field direction; the support portion is configured to provide electrical isolation and mechanical support for the ion generation electrode and the collecting electrode; a surface of the support portion between the ion generation electrode and the collecting electrode comprises a surface coating layer configured to resist ion bombardment and the accidental arcing. Since the surface of the support portion has a surface coating layer configured to resist ion bombardment and the accidental arcing, and therefore, even in high humidity environment, a discharge channel along the surface of the support portion between the ion generating electrode and the collecting electrode will not be formed, and it overcomes the insulating instability of the plastic or ceramic support portion in the high-voltage electric field, avoids the damage to the support portion by the high-voltage, and effectively extends the life of the air cleaning apparatus. Furthermore, the air cleaning apparatus, even is used in high humidity environments, a conductive path along the surface of the supporting portion between the ion generation electrode and the collecting electrode is not easy to formed, it protects the support portion from being damaged by high-voltage, and avoid producing a continuous arcing noise.

Figure 2:
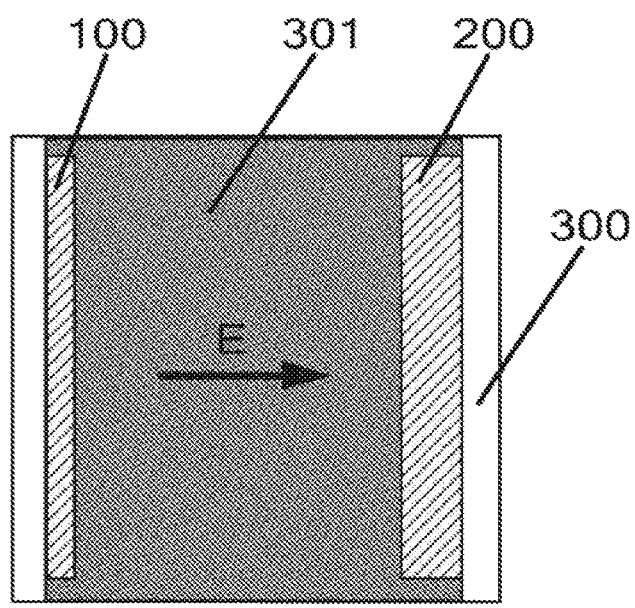
FIG. 2 is a schematic cross-sectional view of the air cleaning apparatus of the present disclosure.

According to the schematic cross-sectional view of the air cleaning apparatus in an embodiment, referring to FIG. 2, the air cleaning apparatus includes an ion generation electrode 100, a collecting electrode 200 and a support portion 300, the ion generation electrode 100 is set opposite to the collecting electrode 200. Wherein the ion generation electrode is configured to apply a high-voltage, between the collecting electrode 200 and the ion generation electrode 100 a high electric field E is formed, the direction of the high electric field is indicated by the arrow in FIG. 2. The support portion 300 supports the edge of the ion generation electrode 100 and the collecting electrode 200, the support portion 300 is configured to provide electrical isolation and mechanical support for the ion generation electrode 100 and the collecting electrode 200. The support portion comprises a surface coating layer 301 on the surface of the support portion 300 between the collecting electrode 200 and the ion generation electrode 100, the surface coating layer 301 is configured to resist ion bombardment and the accidental arcing. The surface coating layer 301 may preferably be made of high dielectric strength and large volume resistivity material. A gas passage can be formed along the direction of the high-voltage electric field between the collecting electrode 200 and the ion generation electrode 100. For example, the ion generation electrode 100 and the collecting electrode 200 may also have a gas passage that allows gas purified to flow from the ion generation electrode 100 to the collecting electrode 200 along the direction of the high-voltage electric field.

The surface of the support portion comprises: a surface of the support portion supporting the ion generation electrode, a surface of the support portion supporting the collecting electrode, and the surface of the support portion between the ion generation electrode and the collecting electrode, in other words, the surface of the support portion comprises a surface coating layer configured to resist ion bombardment and the accidental arcing, when the ion generation electrode and the collecting electrode is applied a high-voltage to form high electric field, the conductive path along the surface of the support portion between the ion generation electrode and the collecting electrode will not be formed when the moist air passes through the ion generation electrode and the collecting electrode, so as to ensure the normal operation of the air cleaning apparatus.

Preferably, the surface coating layer 301 comprises a hydrophobic migration and electrically insulating material. The electrically insulating material is preferably has a hydrophobic angle greater than 90°, such as rubber.

Preferably, the surface coating layer 301 or the surface of the supporting portion 300 between the collecting electrode and the ion generation electrode comprises one or more of: a room temperature vulcanized (RTV) series material, a rubber-based material, or a ceramic-based material. The surface coating layer is formed by spraying or applying an adhesive to the surface of the supporting portion, and specifically, the surface coating layer can be a layer of RTV or PRTV; the support portion can be made of ordinary plastic, etc.

Preferably, the surface coating layer 301 may be made of anti-tracking index reaching DL/T 627 standard and TM4.5 grade material, such as RTV type (Room Temperature Silicone Rubber), PRTV (Permanent Room Temperature Vulcanized), etc.

Preferably, the surface coating layer may be made of arc resistance index reaching DL/T627 standard greater than 500s material, such as injection molding rubber.

Preferably, the surface coating layer may be made of arc resistance index reaching ASTM D495 standard greater than 300s material, such as injection molding rubber.

Preferably, the surface coating layer is configured to reduce accumulation of carbon layers to thereby reduce conductive channels upon arc burning of the surface coating layer.

Preferably, the support portion and the surface coating layer are composed of a same material, such as RTV material.

Additionally, the air cleaning apparatus in another embodiment of the present disclosure, wherein the support portion comprises a hydrophobic migration and electrically insulating material, the support portion is formed by injection or extrusion molding. The support portion will fix the ion generation electrode and the collecting electrode and make them electrically isolated.

As an example in RTV material, RTV material's proof tracking index (CTI) reaches TM4.5 level, in other words, with a high-voltage of 4.5 KV continuous discharge 6 hours on RTV, the properties of RTV material are not damaged. However, the conventional ABS (Acrylonitrile Butadiene Styrene) material, commonly known as super shatterproof plastic material, its CTI is less than 600v.

In addition, the RTV material is burned arc, and generates "silica", the silica itself is not conductive. However the ABS is burned and generates a carbon layer, the carbon layer is a conductor, so the insulation reduces, causes the ion generation electrode and the collecting electrode in a high-voltage apparatus made of ABS material are conductive, and makes failure of the apparatus.

Arc resistance of RTV materials is 590s, that is, continuous arc ignition can reach larger than 590s, arc resistance of ABS material is 60-100s, and arc resistance of conventional plastic is less than 200s.

RTV material is hydrophobic, migration, that is to say, the water on the RTV material converges into water droplets, does not form a conductive "path." In the harsh environment of high temperature and high humidity, RTV surface is not easy to form a conductive channel, it will not be high-voltage breakdown. The ABS material is hydrophilic, in hot and humid environment, the water on the surface of ABS material will form a conductive path, and makes damage to insulation of material.

Figure 3:
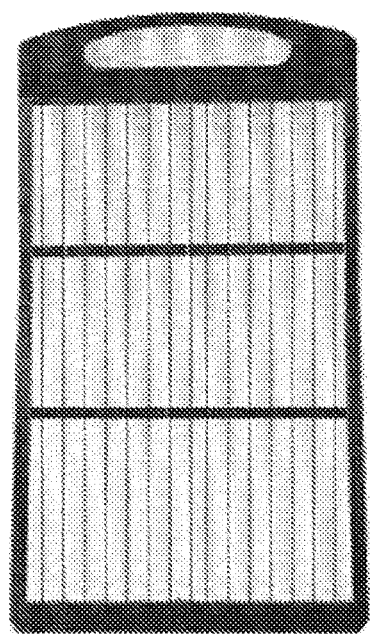
FIG. 3 is a schematic view of the ion generation electrode of the air cleaning apparatus in embodiment.

The ion generation electrode of the air cleaning apparatus in an embodiment of the present disclosure (referring to FIG. 3) comprises a plurality of metal wires, the plurality of metal wires are arranged in parallel. In another embodiment of the present disclosure, the metal wires of the ion generation electrode may comprise metal material such as aluminum, preferably, the plurality of wires are arranged in parallel in a plane, and have a gap between the metal wires as the gas passage.

The collecting electrode of the air cleaning apparatus in an embodiment of the present disclosure (referring to FIG. 4) include a plurality of metal plates arranged in parallel, the gap between the metal plates is a gas passage; the metal plates of the collecting electrode are set substantially parallel to the metal wires of the ion generation electrode.

The ion generation electrode (referring to FIG. 3) and the collecting electrode (referring to FIG. 4) are electrically isolated and mechanically supported by the support portion 300 (referring to FIG. 5), wherein the ion generation electrode is inserted in the support portion along the groove 101; the collecting electrode is inserted in the support portion along the groove 201; the surface of the support portion are entirely made of hydrophobic mobility and insulating material.

Figure 6:
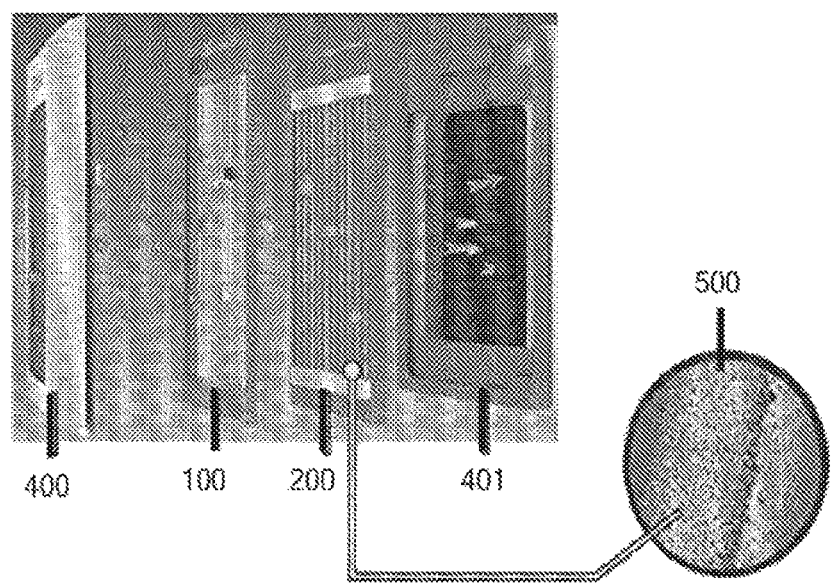
FIG. 6 is a air cleaning apparatus working schematic of the present disclosure.

FIG. 6 is a air cleaning apparatus working schematic of the present disclosure, the air with bacteria and other harmful substances passes through the primary filter 400 of an inlet of the air cleaning apparatus, in the high-voltage of the ion generation electrode 100 a portion of the air is ionized to form plasma field, bacteria and other harmful substances will be killed by the high-energy free radical oxidation when passing through the plasma field, at the same time, formaldehyde and other organic substances are decomposed into water and carbon dioxide by the high-energy free radical oxidation. A portion of the air partially ionized in the electric field is accelerated and collides with other particles, and make them electrically charged, by such a series of avalanche effect, most of the dust and bacteria in the air cleaning apparatus are electrically charged. The charged dust particles in the electric field moves to the collecting electrode 200, and ultimately is adsorbed on the collecting electrode with opposite charge. The enlarge area 500 in the FIG. 6 is a view of dust adsorbed on the collecting electrode 200. After the charge is neutralized, clean air maintains its kinetic energy to move out from the outlet 401, and then to form the ion wind with the air circulating of the entire space.

In the development process of this invention, the inventors did a lot of research about the support portion or the surface material of the support portion between the collecting electrode and the ion generation electrode, the results show: injection molding of PPE materials for test of 24 hours continuous high-voltage failed after two weeks; Teflon material (commonly known as the king of plastic) also failed in high-voltage. But silicone rubber material, such as RTV, PRTV, used as a surface of the support portion, in the three prototype is tested in high-voltage for a few months, there is no significant decline in the insulation performance, the effect is significant.

In the rapid aging test of the air cleaning apparatus, ABS model without covered by rubber material, placed in 35□, 85% RH environment for continuous operation, occurs short circuit fault after a month, accompanied by discharge noise like 'popo.' Conventional air purifier (also belong to the high-voltage mode) placed in 35□, 85% RH environment for continuous operation, did not work and occurs short circuit fault after only two days. However, the air cleaning apparatus of the present disclosure covered by rubber material, such as RTV, placed in 35□, 85% RH environment for continuous power operation for several months, is still working.

These results demonstrate that the air cleaning apparatus of the present disclosure with the surface of the support portion between the ion generation electrode and the collecting electrode, which is covered by the surface coating layer configured to resist ion bombardment and the accidental arcing, can not form a conductive path between the collecting electrode and the ion generation electrode.

Figure 7:
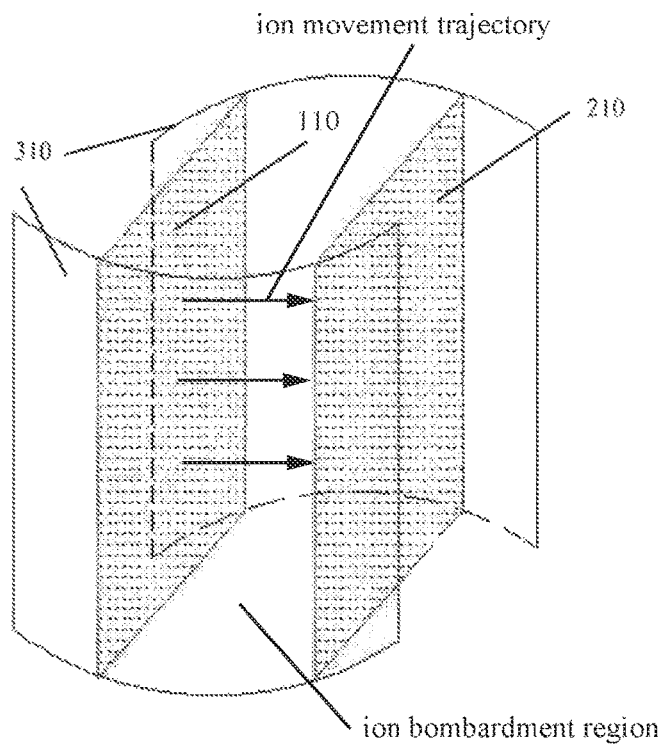
FIG. 7 is a schematic view of the support portion of the air cleaning apparatus in another embodiment.

In other embodiments of the present disclosure, the support portion has an arc-shaped concave portion facing an ion movement trajectory, or the surface of the support portion is disposed away from an ion bombardment region (referring to FIG. 7). for example, the support portion 310 has an arc-shaped concave portion facing an ion movement trajectory, the surface of the support portion 310 between the ion generation electrode 110 and the collecting electrode 210 is a concave arcuate. That is to say, the support portion between the ion generation electrode 110 and the collecting electrode 210 has an arc-shaped concave portion facing an ion movement trajectory so that the surface coating layer formed by spraying, or applying an adhesive to the surface of the support portion between the ion generation electrode 110 and the collecting electrode 210 has an arc-shaped concave portion far away the ion movement trajectory. Compared to a planar surface of the surface coating layer paralleling to the ion movement trajectory, the surface coating layer is far from the ion movement trajectory, reduces the damage to the surface coating layer of the support portion by ion bombardment and arc discharge.

It should be noted that the material of the surface coating layer of the air cleaning apparatus of the present disclosure is not limited to the above materials, all the modified or derived material associated with RTV such as FRTV (Fluoride Room Temperature Silicone Rubber) belong to the RTV series material. And rubber-modified materials, or rubber-derived materials such as fluorine rubber, silicone rubber, belong to the rubber series material.

The air cleaning apparatus of the invention can be used in home air purifier, can also be added on other electrical equipment to purify the environment around the electrical equipment, to extend the life of the electrical equipment.

The above-mentioned air cleaning apparatus may be used with a transformer.

In the operating parameters of the transformer, the transformer operating frequency plays a very important role in the runtime performance of the transformer. The transformer could works in its optimal state only in the best operating frequency, especially for high-frequency transformer, even if the operating frequency is very close to the optimum operating frequency, it also has a big impact on the working status of the high-frequency transformer. When the high frequency transformer works long in a non-optimal operating frequency, if the operating frequency is not promptly corrected, the power consumption of the high frequency transformer will increase, energy efficiency becomes low, the high-frequency transformer itself accelerates heat, even the transformer will be burned, and affects the normal operation of the system.

In current applications of the high-frequency transformer, it usually produces a natural oscillation with a fixed frequency of the chip, by the oscillation of the transformer, the secondary voltage generates correspondingly. In theory, the natural frequency is the optimum operating frequency of the transformer, thus the transformer would be best to run on the natural frequency. However, in the production process of the transformer, there will be inevitably certain production error, and this error in the production process is generally difficult to detect, and it will make the optimum operating frequency shift, brings a big risk for the normal use of the system. And in the actual operation process, it will be affected by temperature, humidity and barometric pressure and other environmental factors, optimum operating frequency of the high frequency transformer also appear offset phenomenon. However, this current application does not consider the natural frequency error and deviation of the natural frequency and the optimum operating frequency caused by environmental factors, when the high frequency transformer runs in the natural frequency, the power consumption of high-frequency transformer increases, energy efficiency becomes low, the temperature of the transformer itself becomes hot and even burns the high-frequency transformer.

For transformers, especially high-frequency transformer, running closer to the optimum operating frequency of the frequency transformer is an important factor in ensuring the effective performance of the transformer. If the operating frequency is not promptly corrected, when the high frequency transformer works long in a non-optimal operating frequency, the power consumption of the high frequency transformer will increase, energy efficiency becomes low, the high-frequency transformer itself accelerates heat, even the transformer will be burned, and affects the normal operation of the system.

Figure 8:
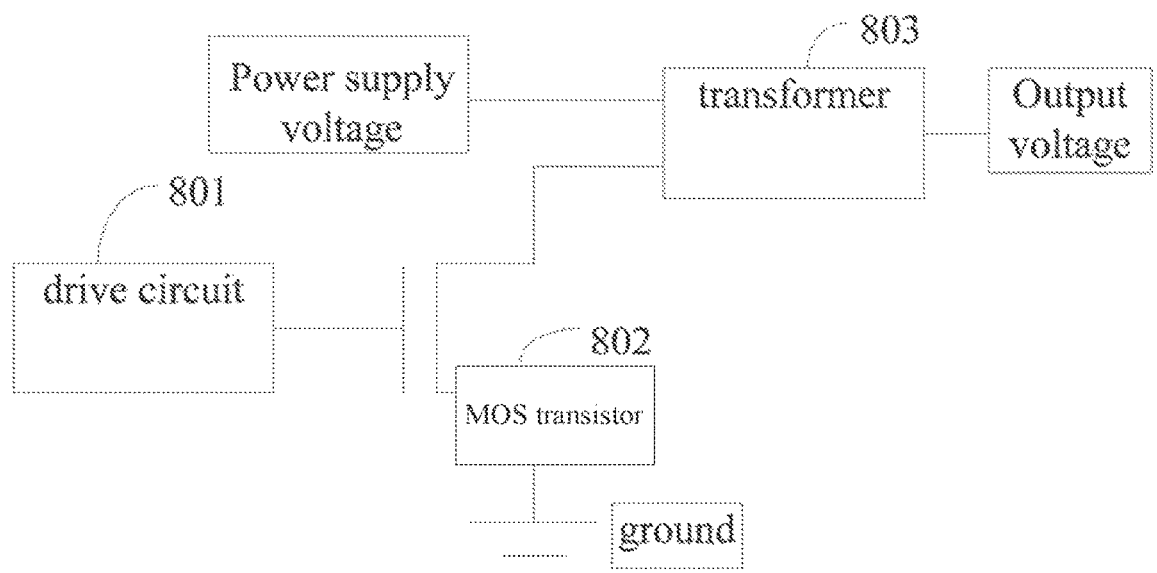
FIG. 8 is a schematic structural view of the switching power supply circuit.

According to FIG. 8, the inventor made a lot of tests of the switching power supply circuit, and summed up one of the best run programs on how to measure the frequency transformer.

Referring to FIG. 8, the switching power supply circuit includes a drive circuit 801, MOS transistor 802 and the transformer 803. The transformer receives the power supply voltage and correspondingly transforms the power supply voltage to output.

Figure 9:
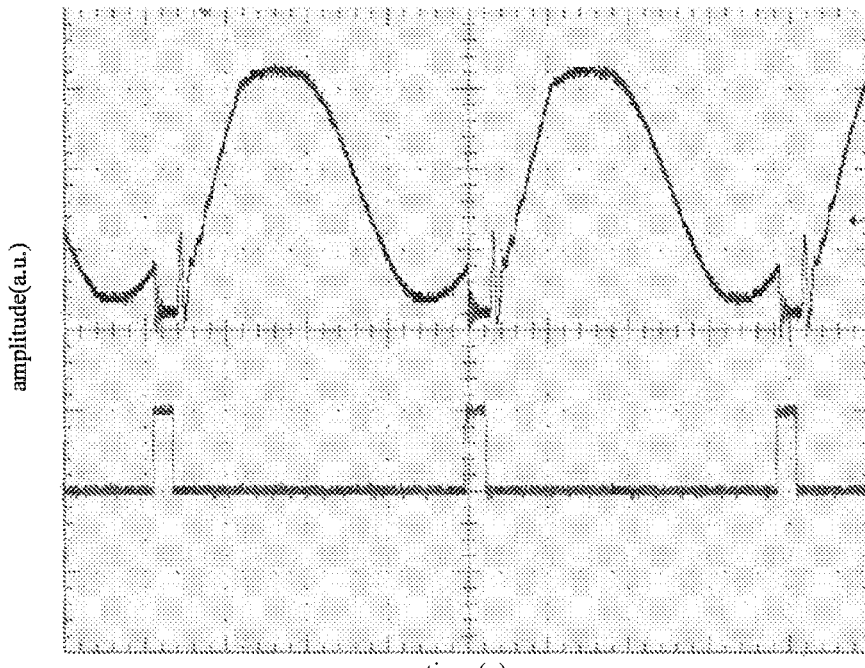
FIG. 9 is a waveform diagram of the high frequency transformer which operating frequency is 64.62 kHz.
Figure 10:
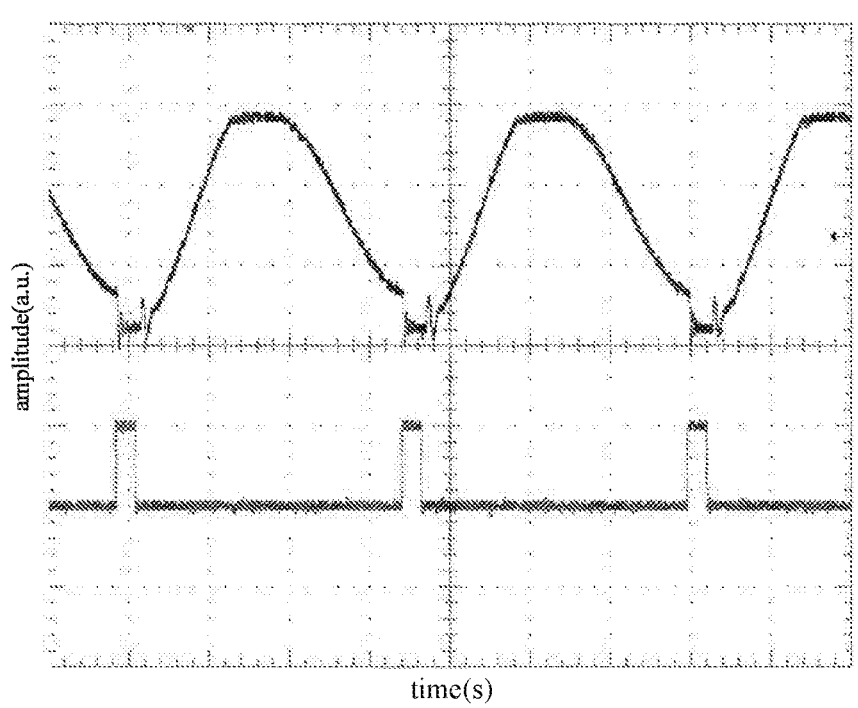
FIG. 10 is a waveform diagram of the high frequency transformer which operating frequency is 70.17 kHz.
Figure 11:
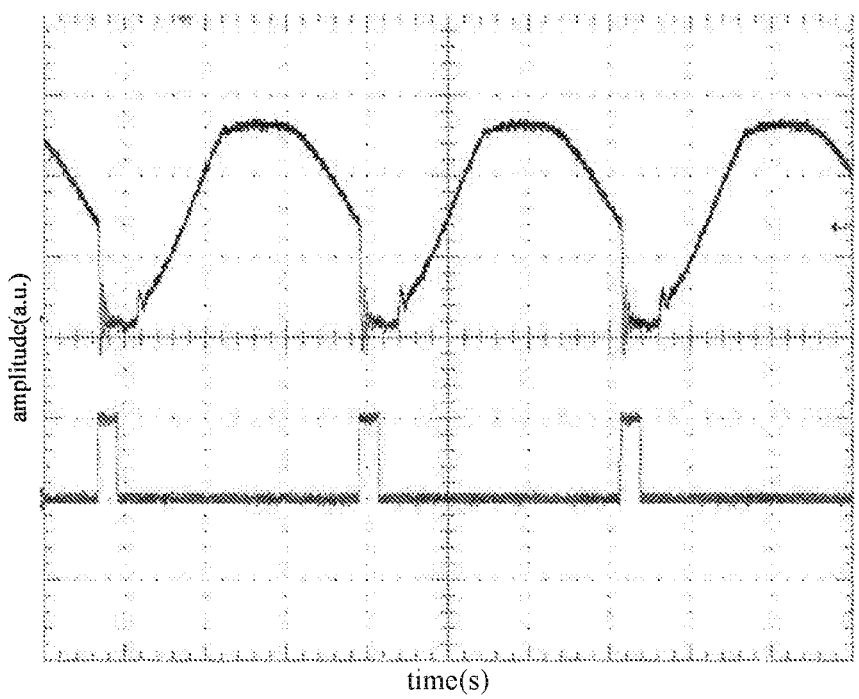
FIG. 11 is a waveform diagram of the high frequency transformer which operating frequency is 77.35 kHz.

According to FIGS. 9, 10 and 11, the transformer is respectively operating at different frequencies, by an oscilloscope, such as a 500 MHz Tektronix Company TDS5054, the output voltage frequency of the driver circuit and the voltage frequency between the transformer and the pin of the MOS transistor are measured for waveform diagrams.

As can be seen from FIG. 9, 10, 11, the output load voltage in FIG. 10 is the smallest, and after running for 2 hours the heat of the transformer in FIG. 9 is the smallest, so the operating state of the transformer in FIG. 9 is better. And it can be summarized by the similar experiment that under the same conditions, the operating status of the transformer is better as the output voltage is smaller, that the operating frequency of the transformer correspondingly at this time is closer to the optimum operating frequency t.

According to the above, the present disclosure provides a method for adjusting the operating frequency of the transformer.

Figure 12:
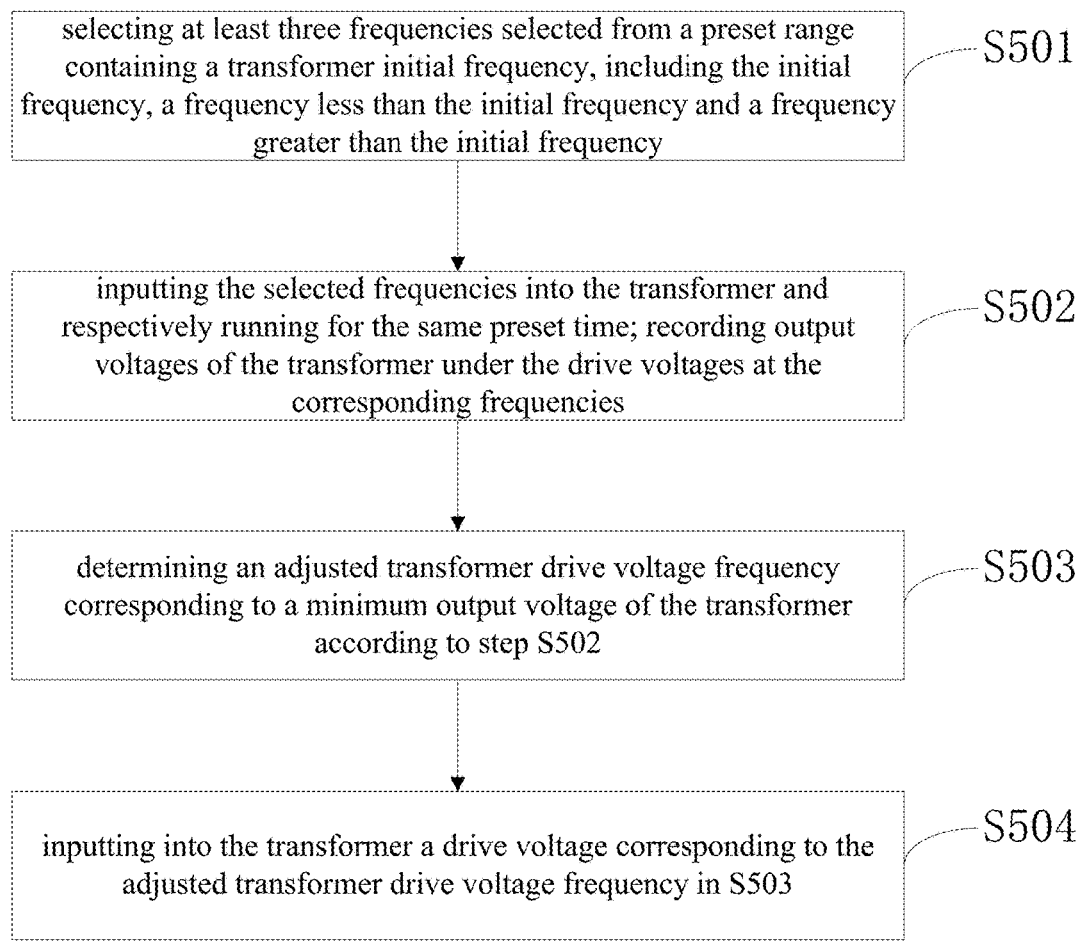
FIG. 12 is a schematic flow diagram of a method to achieve the present disclosure.

Referring to FIG. 12, the transformer has an initial frequency, the method comprises:

S501: selecting at least three frequencies selected from a preset range containing a transformer initial frequency, including the initial frequency, a frequency less than the initial frequency and a frequency greater than the initial frequency.

S502: inputting the selected frequencies into the transformer and respectively running for the same preset time; recording output voltages of the transformer under the drive voltages at the corresponding frequencies.

S503: determining an adjusted transformer drive voltage frequency corresponding to a minimum output voltage of the transformer according to step S502.

S504: inputting into the transformer a drive voltage corresponding to the adjusted transformer drive voltage frequency in S503.

After S504 further comprising: replacing the initial frequency of the transformer with the adjusted frequency in S503. So that when the method of the invention is implemented in the loop executes, the last adjusted frequency can be used as the initial frequency of the second execution. It ensures that a new frequency which is closer to the optimum operating frequency is selected from a range containing the last adjusted frequency which is close to the optimum operating frequency in each cycle.

Between S503 and S504 may further comprising: storing the adjusted frequency in S503, and prior to S501 further comprising: determining whether the adjusted frequency is stored, if not, executing S501, if yes, inputting the drive voltage of the stored adjusted frequency into the input terminal of the transformer.

The selection in S501 may be uniformly selecting or the selection according to predetermined rule.

The driving voltage may be a rectangular wave drive voltage, or a sinusoidal driving voltage.

The transformer can be high-frequency transformer. For the high frequency transformer, even if the difference between the operating frequency and the optimum operating frequency is small, it also will have a huge impact on the working status of the high-frequency transformer, however for other transformers, the impact of the operating frequency is relatively small, therefore the method of the present disclosure is mainly used to adjust the operating frequency of the high frequency transformer.

The initial frequency may be the natural frequency. Generally, when the operating frequency of transformer is adjusted for the first time, the initial frequency is set to the natural frequency. When the method of the present disclosure is implemented in the loop executes, the initial frequency is set to the last adjusted frequency.

Wherein, the natural frequency is the optimum operating frequency of the transformer which is set in manufacturing process.

Figure 13:
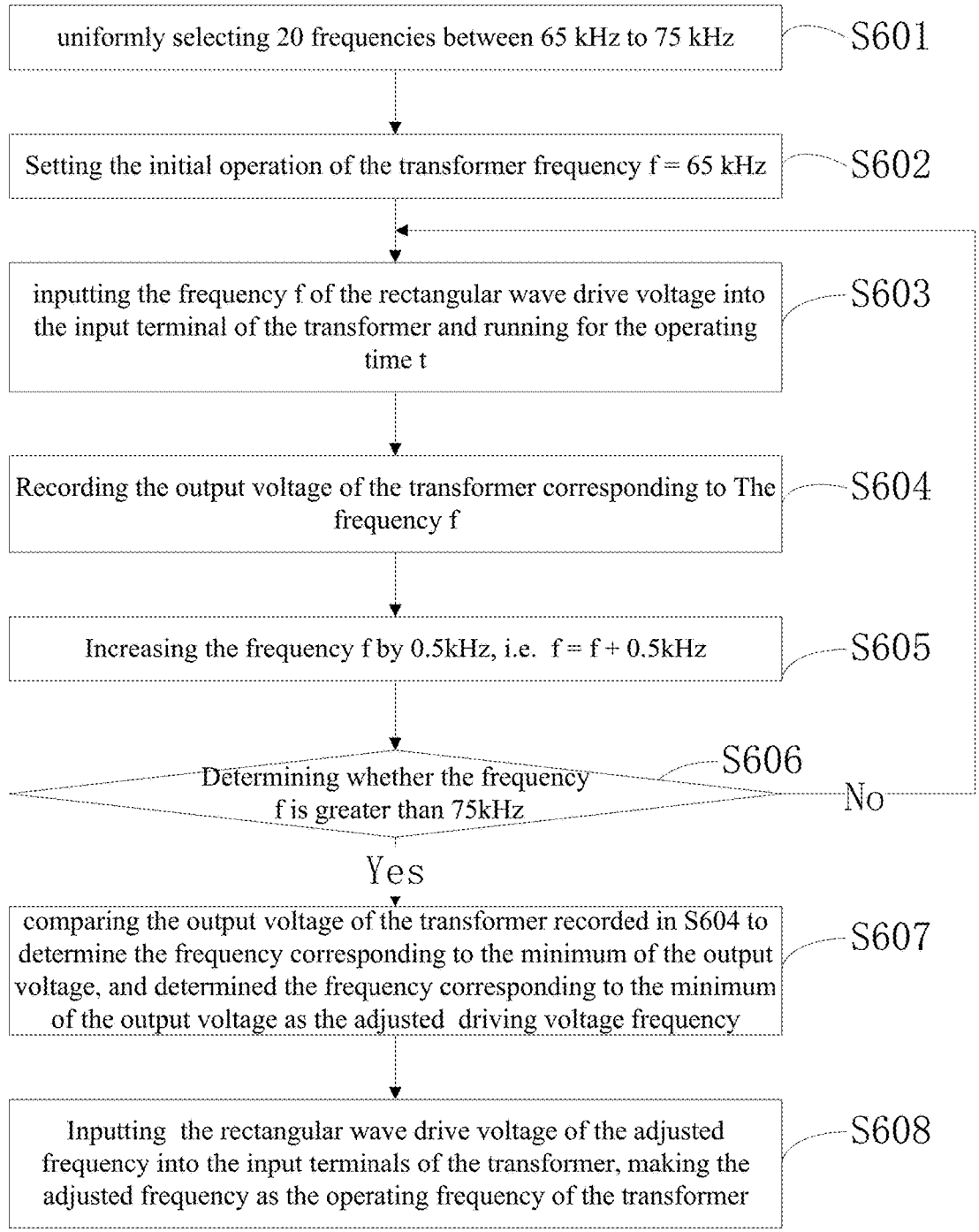
FIG. 13 is a schematic flow diagram to achieve the method of the present disclosure in embodiment.

FIG. 13 is a specific embodiment of the present disclosure. The natural frequency of a high frequency transformer is 70 kHz. This embodiment is the specific process of the operating frequency adjustment of the high-frequency transformer for the first time. Because it is the first time to adjust the operating frequency, the natural frequency of the high frequency transformer is set as the initial frequency of this adjustment.

Specific steps are as follows:

S601: uniformly selecting 20 frequencies between 65 kHz to 75 kHz. In this specific embodiment, the preset frequency range is the range of plus or minus 5 kHz centered on the natural frequency of the transformer. In this way the preset frequency selected from the preset frequency range will be set around the natural frequency of the transformer, and the natural frequency of the transformer is generally closer to the optimum operating frequency of the transformer, therefore selecting in the vicinity of the natural frequency of the transformer can be closer to the optimum operating frequency of the transformer. In this embodiment, the twenty (20) frequency selected is uniform. In other embodiments, it also may be selected in other ways.

S602: Setting the initial operation of the transformer frequency f=65 kHz. In this embodiment, the initial operating frequency of the inverter is 65 kHz, and then gradually increasing the operation frequency by 0.5 kHz. In other embodiments, the twenty frequency selected in S602 can run in other order, it does not affect the implementation of the present disclosure.

S603: inputting the frequency f of the rectangular wave drive voltage into the input terminal of the transformer and running for the operating time t. The drive voltage frequency of the input terminal of the transformer is the operating frequency of the transformer. Running for the operating time t can ensure that the transformer at this frequency is relatively stable.

S604: Recording the output voltage of the transformer corresponding to the frequency f.

S605: Increasing the frequency f by 0.5 kHz, i.e. f=f+0.5 kHz.

S606: determining whether the frequency f is greater than 75 kHz. That is to determine whether the frequency f is out of the original preset frequency range. If not, return to the S603, going on run the remaining frequency of the 20 frequencies selected. If yes, execute S607, at this time the transformer has finished running on 20 frequencies selected.

S608: comparing the output voltage of the transformer recorded in S604 to determine the frequency corresponding to the minimum of the output voltage, and determined the frequency corresponding to the minimum of the output voltage as the adjusted driving voltage frequency. The output voltage is smaller, the operational status of the transformer is better, the adjusted driving voltage frequency within the preset range is the closest to the optimum operating frequency.

S608: Inputting the rectangular wave drive voltage of the adjusted frequency into the input terminals of the transformer, making the adjusted frequency as the operating frequency of the transformer.

In other embodiment, it can also be used the sine wave drive voltage instead of the rectangular wave drive voltage, it does not affect the implementation of the present disclosure.

Figure 14:
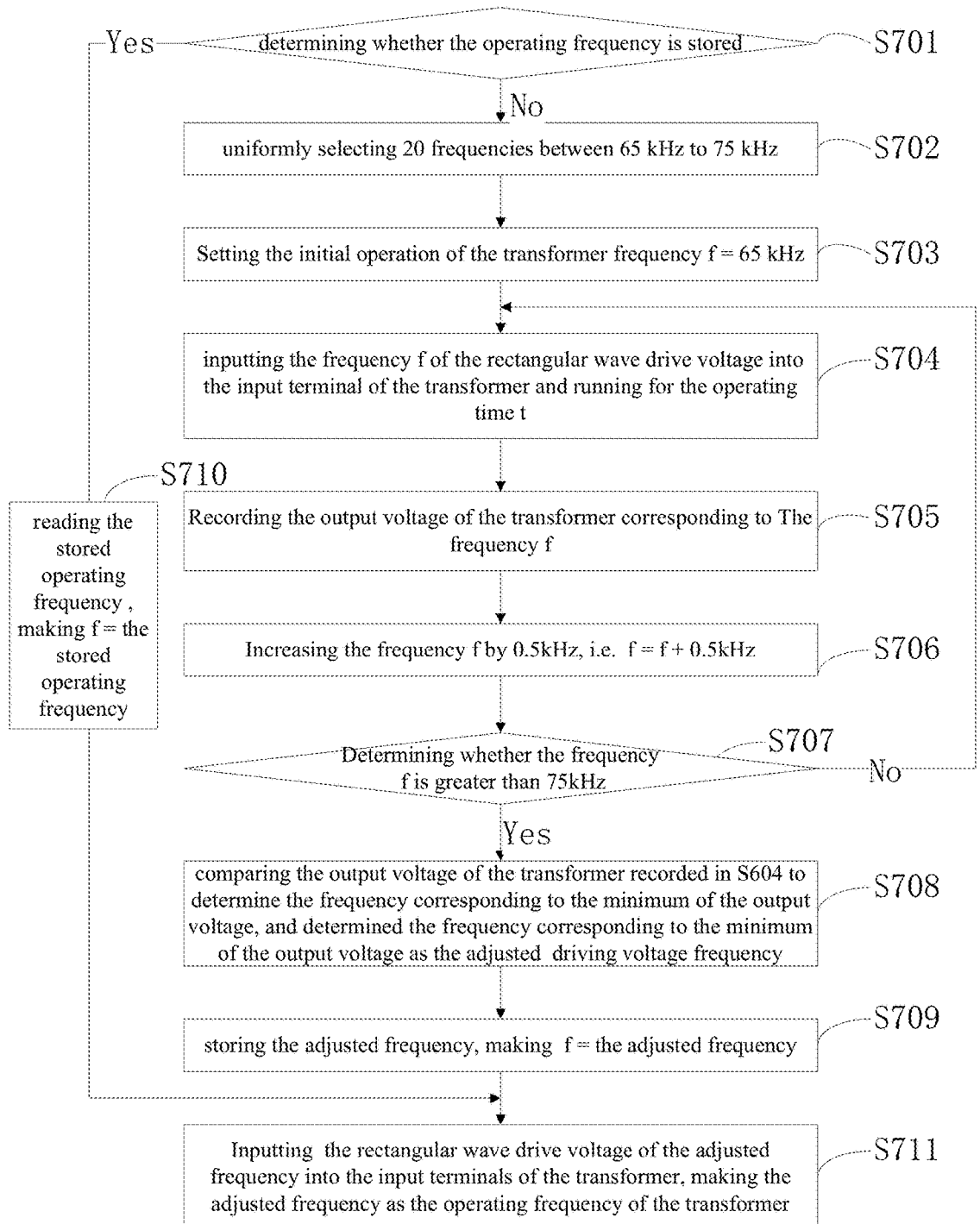
FIG. 14 is a schematic flow diagram to achieve the method of the present disclosure in another embodiment.

FIG. 14 is another embodiment of the present disclosure. The natural frequency of a high frequency transformer is 70 kHz. The specific process is as follows:

S701: determining whether the operating frequency is stored, and if yes, executing S710, and if not, executing S702.

S702 to S708 and S601 to S607 are the same, so no further repeat.

S709: storing the adjusted frequency, making f=the adjusted frequency. and then executing S711.

S710: reading the stored operating frequency, making f=the stored operating frequency.

S711: inputting the rectangular wave drive voltage of the stored frequency f into the input terminal of the transformer.

Figure 4:
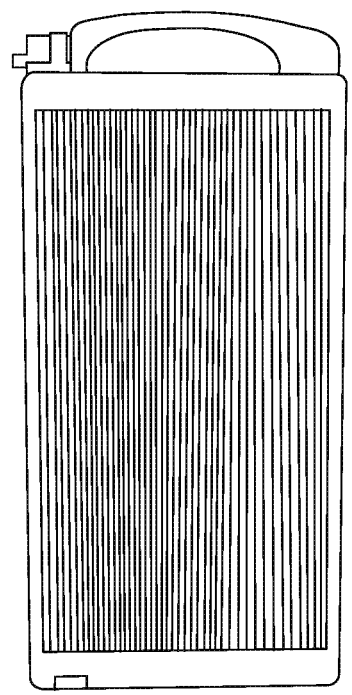
FIG. 4 is a schematic view of the collecting electrode of the air cleaning apparatus in embodiment.
Figure 5:
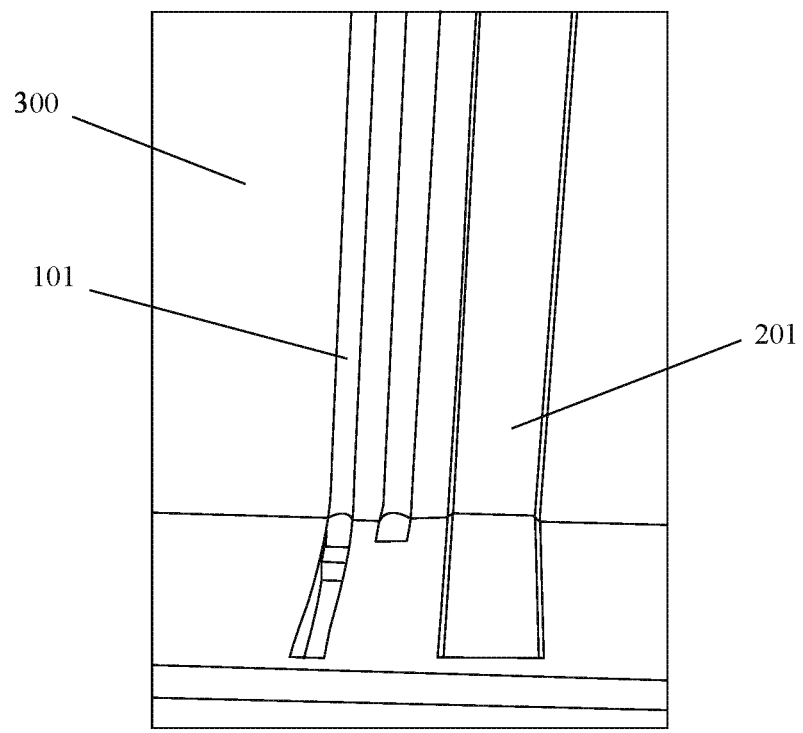
FIG. 5 is a schematic view of the support portion of the air cleaning apparatus in embodiment.

As can be seen, the difference between this embodiment of FIG. 4 and the embodiment of FIG. 13 is that, in this embodiment of FIG. 4, the frequency obtained in S708 is stored after the adjustment, so that when the operation of the embodiment starts, the implementation of S701 runs first, determine whether the operation frequency of the high-frequency transformer has previously been adjusted and store the adjusted frequency, if yes, directly read the stored operating frequency and make the high-frequency transformer running on the stored operating frequency, and if not, adjust the operating frequency of the high-frequency transformer, and the initial frequency is still the natural frequency of the high-frequency transformer.

This specific embodiment, can also use the sine wave drive voltage instead of rectangular wave drive voltage, it does not affect the implementation of the present disclosure.

Figure 15:
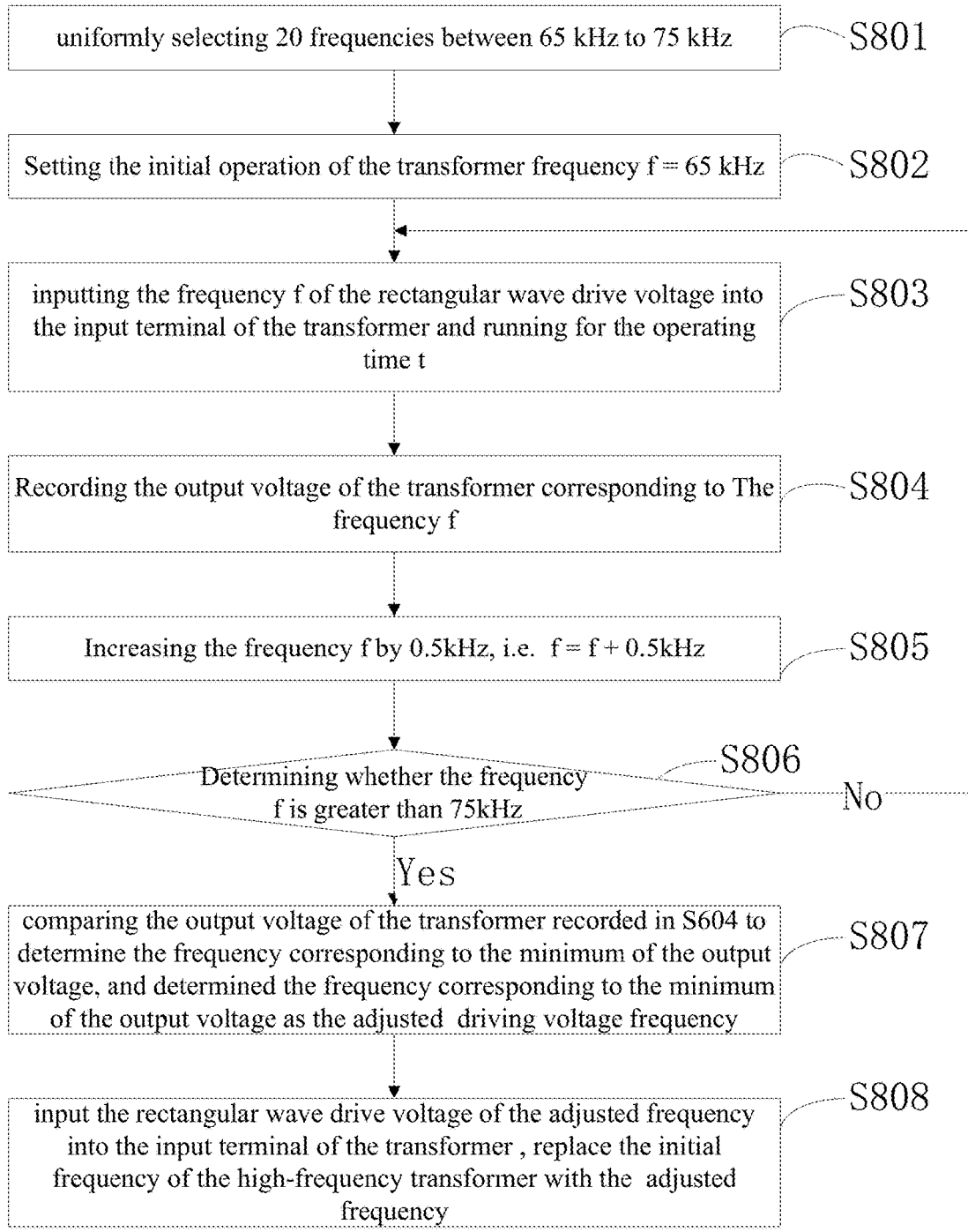
FIG. 15 is a schematic flow diagram to achieve the method of the present disclosure in another embodiment.

The present disclosure provides a further specific embodiment of FIG. 15. The natural frequency of a high frequency transformer is 70 kHz. This embodiment is the specific process of adjustment of the high-frequency transformer operating frequency for the first time. Because it is the first time to adjust the operating frequency, the natural frequency of the high frequency transformer is set as the initial frequency of the adjustment. The specific process is as follows:

S801 to S807 and S601 to S607 are the same, so no further repeat.

S808: input the rectangular wave drive voltage of the adjusted frequency into the input terminal of the transformer, replace the initial frequency of the high-frequency transformer with the adjusted frequency.

This specific embodiment, can also use the sine wave drive voltage instead of rectangular wave drive voltage, it does not affect the implementation of the present disclosure.

As can be seen, the difference between this embodiment of FIG. 15 and the embodiment of FIG. 13 is that, the adjusted frequency in the embodiment of FIG. 15 will be implemented as an initial frequency, so it can be executed in cyclic process to the adjust the operating frequency of the high frequency transformer. And thereafter when the loop is executed, the adjusted frequency can be used as the initial frequency of the next adjustment.

Figure 16:
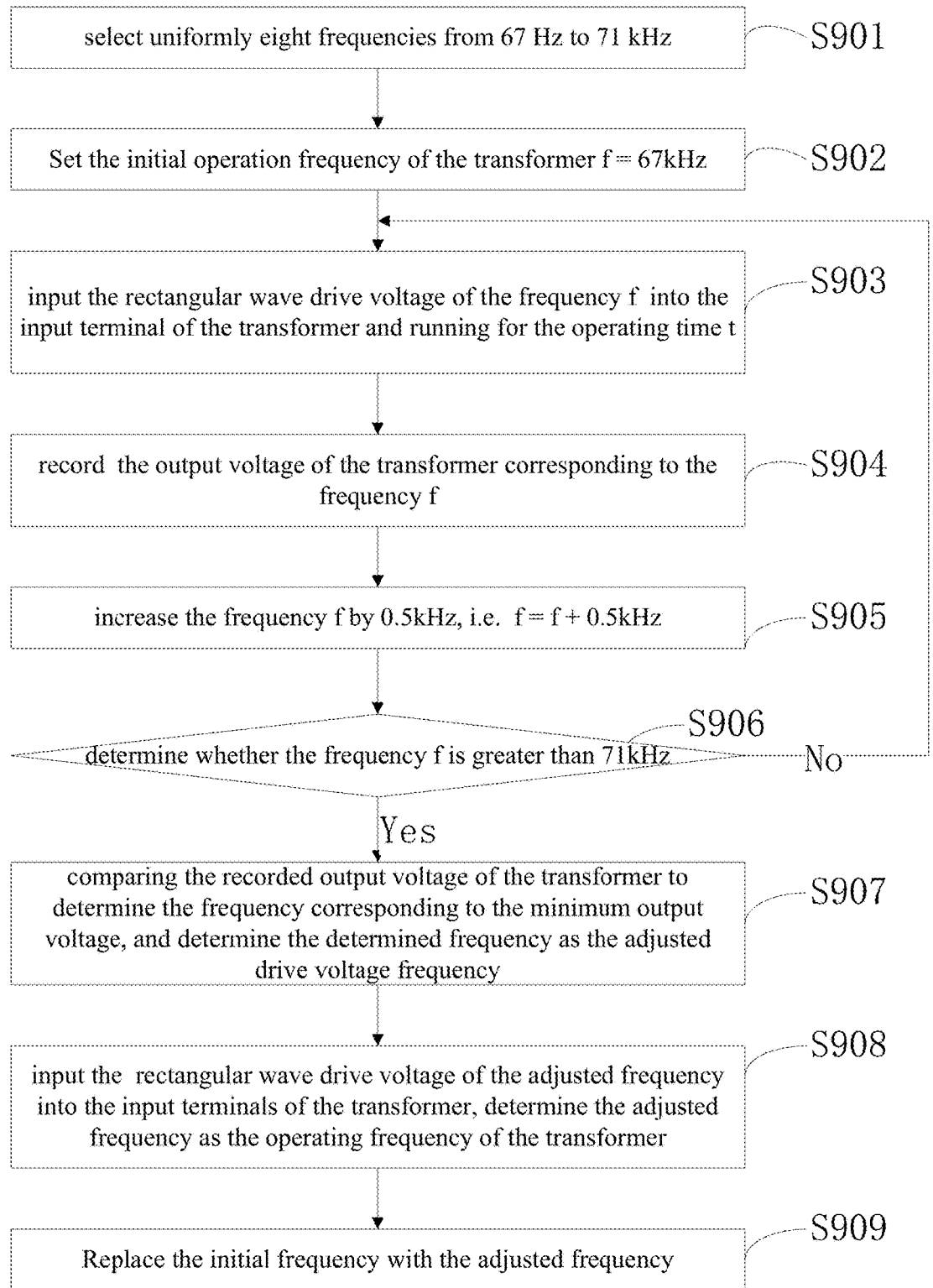
FIG. 16 is a schematic flow diagram to achieve the method of the present disclosure in another embodiment.

FIG. 16 provides a another embodiment, the method specifically described the specific process of the present disclosure is executed after the embodiment of FIG. 15. The adjusted frequency determined in the embodiment of FIG. 8 is 69 kHz.

S901: select uniformly eight frequencies from 67 Hz to 71 kHz. During the execution of the loop, the initial frequency can be the adjusted frequency of the last adjustment process, and therefore, the initial frequency in this embodiment of the high-frequency transformer is 69 kHz. In the course of the cycle execution after the first adjustment of the operating frequency, the width of the new preset range may be narrower than the width of the last preset range in the last adjustment process. Therefore, in this specific embodiment of FIG. 16, the preset frequency range is selected in range of positive or negative 2 kHz of the center on the initial frequency of the transformer, compared to the range of positive or negative 5 kHz in the embodiment of FIG. 8, the range is smaller. In this embodiment, the eight frequencies is selected uniformly. In other embodiments, it may also be selected in other order.

S902: Set the initial operation frequency of the transformer f=67 kHz. In this embodiment, the initial operating frequency of the inverter is 67 kHz, and then gradually increase the operation frequency by 0.5 kHz. In other embodiments, the eight frequency selected in S902 can also run in another order, it does not affect the implementation of the present disclosure.

S903: input the rectangular wave drive voltage of the frequency f into the input terminal of the transformer and running for the operating time t. The drive voltage frequency of the input terminal of the transformer is the operating frequency of the transformer. Running for the operating time t could ensure that the transformer can stable work at the frequency.

S904: record the output voltage of the transformer corresponding to the frequency f.

S905: increase the frequency f by 0.5 kHz, i.e. f=f+0.5 kHz.

S906: determine whether the frequency f is greater than 71 kHz. Determine whether the frequency f is out of the original preset frequency range. If not, return to the S903, run the remaining frequency of the selected eight frequencies. If yes, execute S907, at this time the transformer has finished running on the selected eight frequencies.

S907: comparing the recorded output voltage of the transformer to determine the frequency corresponding to the minimum output voltage, and determine the determined frequency as the adjusted drive voltage frequency.

S908: input the rectangular wave drive voltage of the adjusted frequency into the input terminals of the transformer, determine the adjusted frequency as the operating frequency of the transformer.

S909: Replace the initial frequency with the adjusted frequency. When the loop is executed at the next time, the adjusted frequency got in this time will be used as the initial frequency of the next adjustment.

In this specific embodiment, it can also use the sine wave drive voltage instead of the rectangular wave drive voltage, it does not affect the implementation of the present disclosure.

Figure 17:
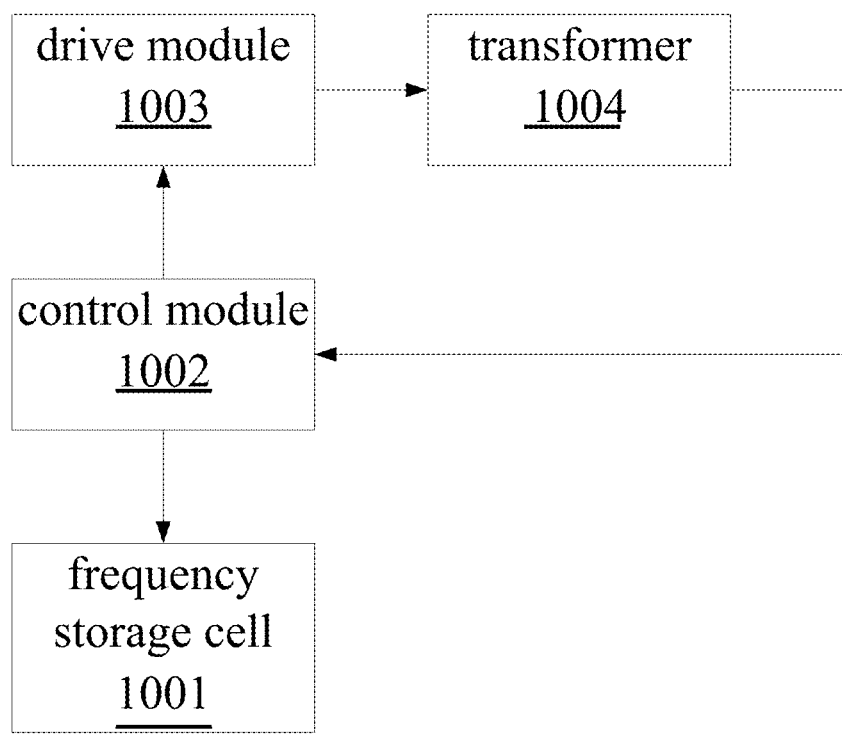
FIG. 17 is a schematic diagram to achieve the system of the present disclosure.

The present disclosure also provides a transformer frequency adjusting system, the transformer has an initial frequency, referring to FIG. 17, the transformer frequency adjusting system comprises: a frequency storage cell 1001, a control module 1002 and a drive module 1003.

Wherein the control module 1002 is configured to read at least three frequencies selected from a preset range containing a transformer initial frequency from the storage cell 1001, and control the drive module 1003 to input drive voltages of the read frequencies into the transformer 1004 and control the transformer to respectively run a same preset time, receive the output voltage of the transformer 1004 at each read frequency of the drive voltage, determine an adjusted transformer drive voltage frequency corresponding to the minimum output voltage of the transformer, and control the drive module 1003 to input into the transformer 1004 a drive voltage of the adjusted drive voltage frequency.

Figure 18:
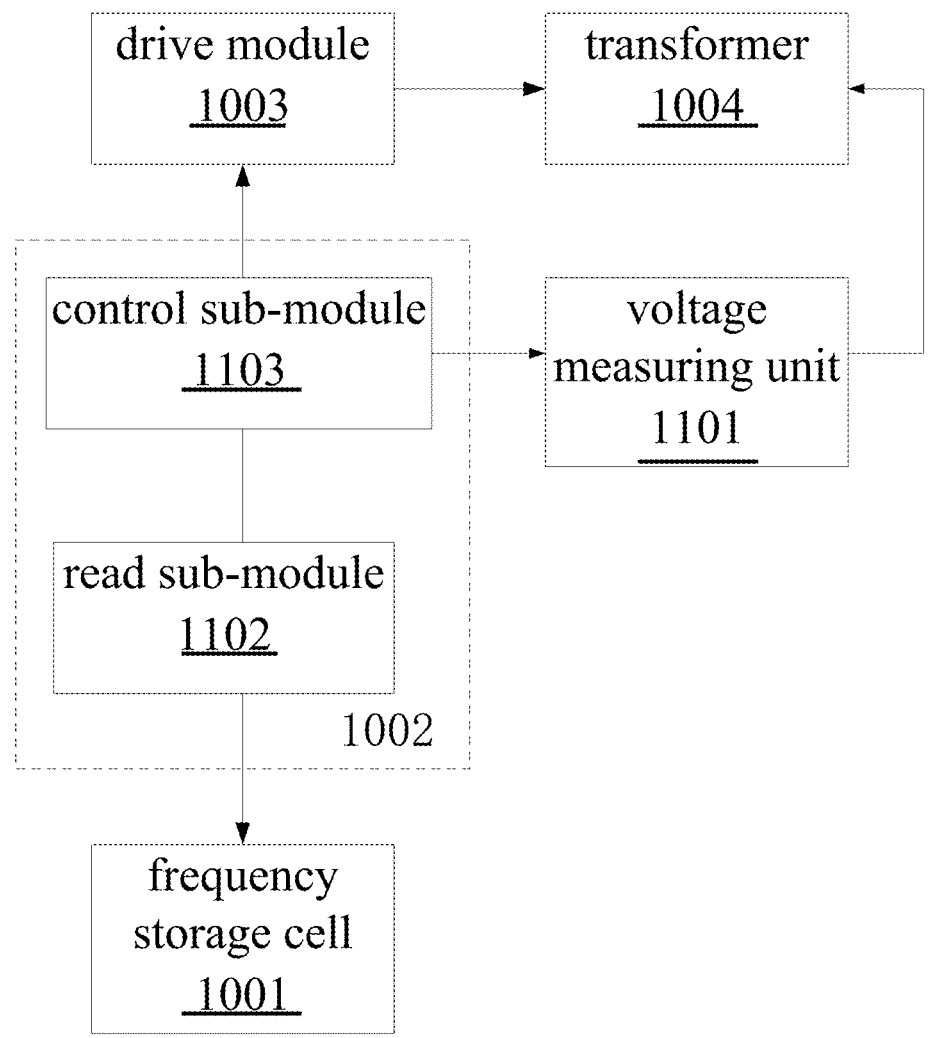
FIG. 18 is a schematic structural diagram of a specific embodiment to achieve the system of the present disclosure.

Referring to FIG. 18, the system may further include a voltage measuring unit 1101 coupled to the output terminal of the transformer, the output voltages of the transformer at each frequency of the drive voltage is measured by the voltage measurement unit 1101.

The control module 1002 may further include: a read sub-module 1102 and a control sub-module 1103.

The read sub-module 1102 reads the at least three frequencies selected from a preset range containing a transformer initial frequency from the frequency storage cell 1001, including the initial frequency, a frequency less than the initial frequency, and a frequency greater than the initial frequency, and send the read at least three frequencies to the control sub-module 1103.

The control sub-module 1103 receives the read frequencies from the read sub-module 1102, controls the drive module 1003 to input the drive voltages of the read frequencies into the transformer 1004 and control the transformer to respectively run the same preset time, and notify the voltage measuring unit 1101 to measure the output voltages of the transformer 1004 in the same preset time interval, receive the output voltage measured by the voltage measuring unit 1101, determine an adjusted transformer drive voltage frequency corresponding to a minimum output voltage of the transformer, and controls the drive module 1003 to input into the transformer 1004 the drive voltage of the adjusted transformer drive voltage frequency.

The system may further include a MOS transistor, the gate electrode of the MOS transistor is coupled to the driver module, the source electrode of the MOS transistor is grounded, and the drain electrode of the MOS transistor is coupled to an input terminal of the transformer.

The transformer can be a high-frequency transformer.

Figure 19:
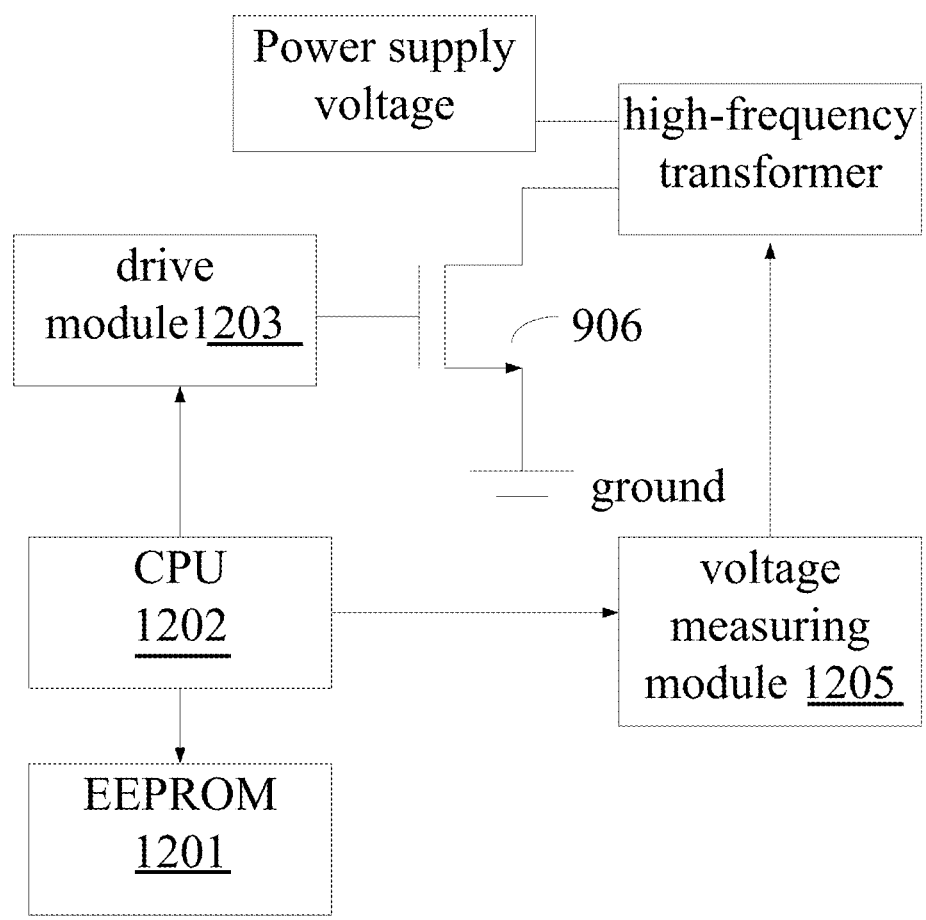
FIG. 19 is a schematic structural diagram of another specific embodiment to achieve the system of the present disclosure.

FIG. 19 is a schematic structural diagram of another specific embodiment to achieve the system of the present disclosure. In this embodiment, the operating frequency of the high-frequency transformer in the switching power supply circuit will be adjusted. The natural frequency of the high-frequency transformer is 105 kHz. The system comprises: an electrically erasable programmable read-only memory (EEPROM) 1201, a CPU (central processing unit) 1202, a drive module 1203, a voltage measuring module 1205 and a MOS transistor 1206.

CPU 1105 reads twenty frequencies with a uniform distribution between the frequency from 65 kHz to 105 kHZ form EEPROM 1101 and controls the drive module 1203 to input drive voltages of the read twenty frequencies into the gate electrode of the MOS transistor 1206 and control the transformer to respectively run the same preset time t, notify the voltage measuring module 1205 to measure the output voltages of the high-frequency transformer 1204 in the time interval t under the drive voltage of each frequency, and receives the output voltage measured by the voltage measuring module 1205, and stores the output voltage corresponding to the each frequency of the drive voltage in EEPROM 1201, based on the stored results in EEPROM 1201, determine an adjusted transformer drive voltage frequency corresponding to the minimum output voltage of the transformer, and controls the drive module 1203 to input the drive voltage of the adjusted transformer drive voltage frequency into the gate electrode of the MOS transistor 1206.

Wherein, the gate electrode of the MOS transistor 1203 is coupled to the drive module 1206, and the source electrode of the MOS transistor is grounded, the drain electrode of the MOS transistor is coupled to the input terminal of the high-frequency transformer 1204, the output terminal of the high-frequency transformer 1204 is coupled to the voltage measuring unit 1205.

The transformer of FIGS. 8-19 can be used in the air cleaning apparatus of FIGS. 1-7, and also can be used for other applications.

The invention is disclosed in a preferred form but may be practiced in various ways without departing from the principles disclosed and discussed. The invention is to be defined and limited only by the appended claims.

The embodiments described above, are only the preferred embodiments of the present disclosure, but are not intended to limit the present disclosure in form. Any person skilled in the art, without departing from the technical scope of the present disclosure in solution, can use the methods and techniques disclosed in the above-described content to make many variations and modifications of the technical scheme of the present disclosure, the equivalent changes or modifications to the equivalent Examples. Therefore, any application without departing from the technical solution, based on a simple modification of the invention made for the implementation of the above cases, the same changes and modifications, would fall within the scope of protection of the technical aspect of the present disclosure.

The invention claimed is:

1. An air cleaning apparatus comprising an ion generation electrode, a collecting electrode, and a support portion, wherein:
    the ion generation electrode is configured to apply a high-voltage to thereby form a high-voltage electric field between the collecting electrode and the ion generation electrode;
    a passage is formed between the ion generation electrode and the collecting electrode along a direction of the high-voltage electric field;
    the support portion supports at edges of the ion generation electrode and the collecting electrode, and is configured to provide electrical isolation and mechanical support for the ion generation electrode and the collecting electrode;
    a surface of the support portion between the ion generation electrode and the collecting electrode comprises a surface coating layer with a property of resisting ion bombardment and accidental arcing;
    wherein the support portion has an arc-shaped concave portion facing an ion movement trajectory, or the surface of the support portion is disposed away from an ion bombardment region.

2. The apparatus of claim 1, wherein the surface coating layer comprises a hydrophobic migration and electrically insulating material.

3. The apparatus of claim 2, wherein the surface coating layer comprises one or more of: a room temperature vulcanized (RTV) series material, a rubber-based material, or a ceramic-based material.

4. The apparatus of claim 1, wherein the surface coating layer is made of one or more materials with a property of reducing accumulation of carbon layers to thereby reduce conductive channels upon arc burning of the surface coating layer.

5. The apparatus of claim 1, wherein the surface coating layer is formed by spraying, or applying an adhesive to the surface of the support portion.

6. The apparatus of claim 1, wherein the support portion comprises a hydrophobic migration and electrically insulating material.

7. The apparatus of claim 6, wherein the support portion is formed by injection or extrusion molding.

8. The apparatus of claim 1, wherein the support portion and the surface coating layer are composed of a same material.

9. A high-voltage ionic purification system comprising the air cleaning apparatus of claim 1 and a transformer frequency adjusting system, wherein:
    the transformer frequency adjusting system including a frequency storage cell, a control module, and a drive module;
    wherein the control module is configured to:
        read at least three frequencies selected from a preset range containing an initial frequency from the frequency storage cell, including the initial frequency, a frequency less than the initial frequency, and a frequency greater than the initial frequency,
        control the drive module to input drive voltages at corresponding frequencies into transformer and control the transformer to respectively run a same preset time;
        receive output voltages of the transformer under the drive voltages at the corresponding frequencies;
        determine an adjusted transformer drive voltage frequency based on a drive voltage frequency corresponding to a minimum output voltage of the transformer; and
        control the drive module to input into the transformer a drive voltage corresponding to the adjusted transformer drive voltage frequency.

10. The system of claim 9, further comprising: a voltage measuring unit coupled to an output terminal of the transformer and configured to measure the output voltages of the transformer.

11. The system of claim 10, wherein the control module comprises:
    a read sub-module and a control sub-module,
    wherein the read sub-module is configured to read the at least three frequencies and send read frequencies to the control sub-module;
    wherein the control sub-module is configured to receive the read frequencies from the read sub-module, control the drive module to input the drive voltages for the frequencies into the transformer and control the transformer to respectively run the same preset time;
    notify the voltage measuring unit to measure the output voltages of the transformer in a same preset time interval;
    receive the output voltages measured by the voltage measuring unit;
    determine an adjusted transformer drive voltage frequency based on a drive voltage frequency corresponding to a minimum output voltage of the transformer; and
    control the drive module to input into the transformer a drive voltage corresponding to the adjusted transformer drive voltage frequency.

12. The system of claim 9, wherein the transformer frequency adjusting system further comprises a MOS transistor, wherein a gate electrode of the MOS transistor is coupled to the drive module, a source electrode of the MOS transistor is grounded, and a drain electrode of the MOS transistor is coupled to an input terminal of the transformer.

13. The system of claim 12, wherein the transformer is a high-frequency transformer.

14. A method for adjusting an operating frequency applied in a transformer of the high-voltage ionic purification system of claim 9, wherein the method comprising:

(A) selecting at least three frequencies, including an initial frequency, a frequency less than the initial frequency, and a frequency greater than the initial frequency;

(B) inputting selected frequencies into input terminal of the transformer and respectively running for same preset time, receiving output voltages of the transformer under drive voltages at corresponding frequencies;

(C) determining an adjusted transformer drive voltage frequency based on a drive voltage frequency corresponding to a minimum output voltage of the transformer according to the received output voltages in step (B): and (D) inputting into the transformer a drive voltage corresponding to the adjusted transformer drive voltage frequency as determined in step (C).

15. The method of claim 14, further comprising: after step (D), replacing the initial frequency of the transformer with the adjusted transformer drive voltage frequency in step (C).

16. The method of claim 14, further comprising:
after steps (C) and (D), storing the adjusted transformer drive voltage frequency in step (C); and
prior to step (A), determining whether the adjusted frequency is stored; if not, executing step (A); if yes, inputting the drive voltage of the stored adjusted frequency into the input terminal of the transformer.

17. The method of claim 14, wherein said selecting in said step (A) comprises uniformly selecting.

18. The method of claim 14, wherein the drive voltages in steps (B) and (D) are rectangular wave drive voltages.

19. The method of claim 14, wherein the initial frequency is an intrinsic frequency of the transformer.

* * * * *